March 17, 1931.   I. T. BENNETT   1,796,317
RADIATOR
Filed Jan. 30, 1928    2 Sheets-Sheet 2
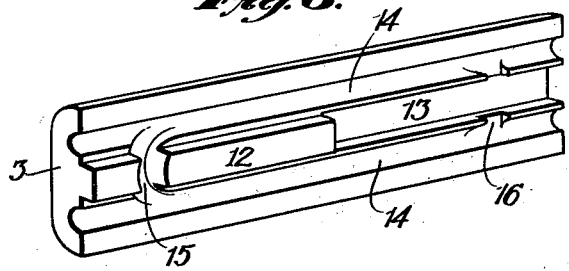
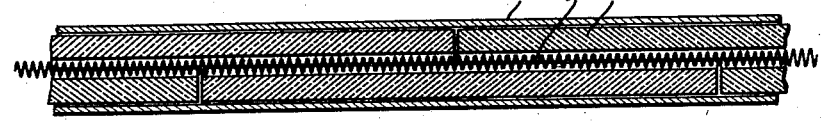
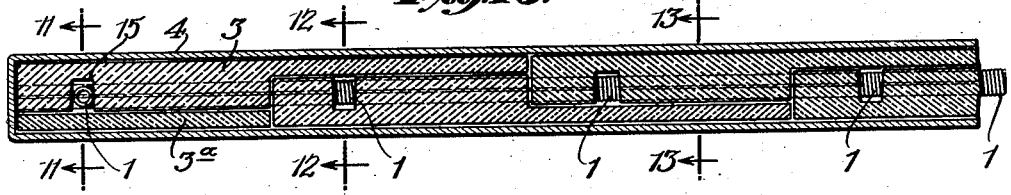
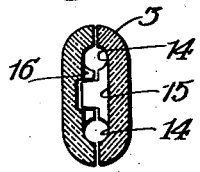 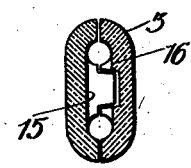 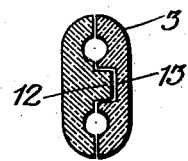
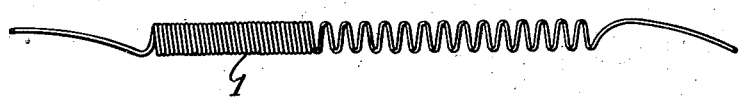
INVENTOR
IRVING T. BENNETT.
ATTORNEY Patented Mar. 17, 1931

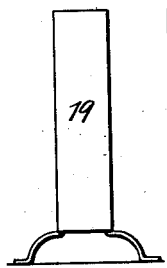
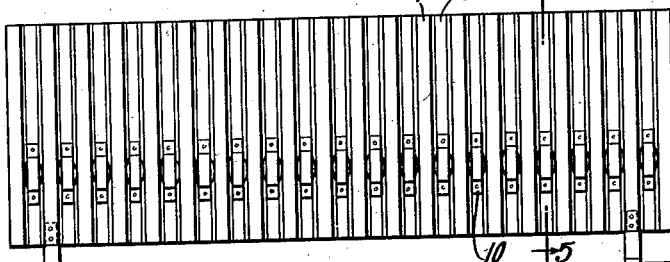
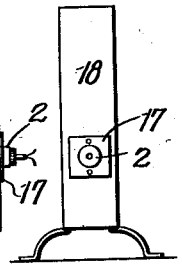
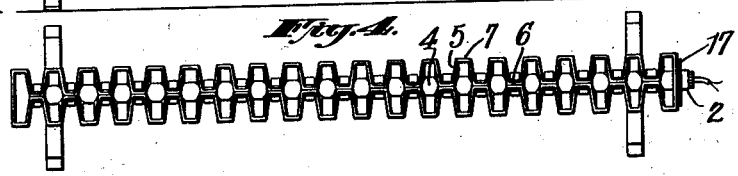
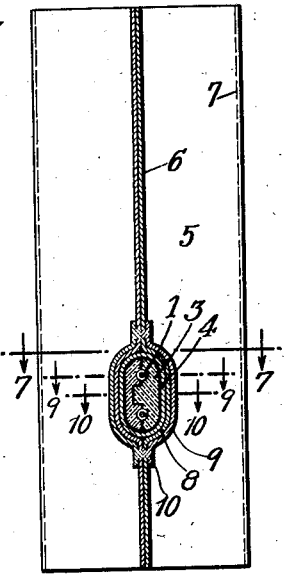
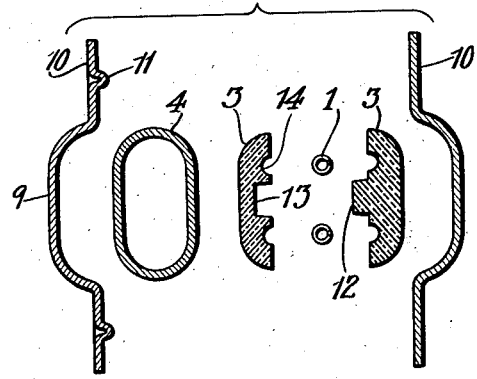
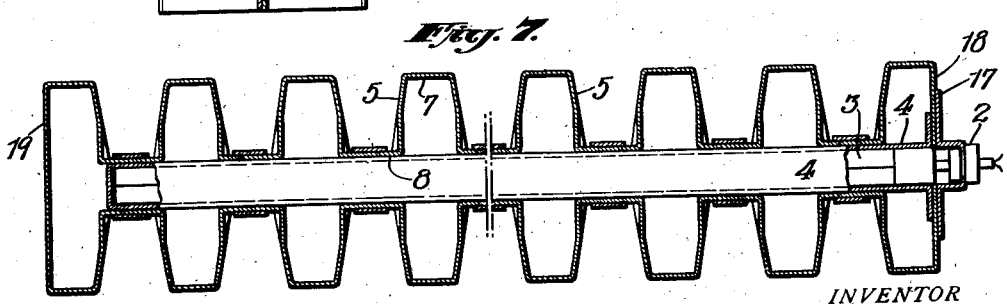

1,796,317

UNITED STATES PATENT OFFICE

IRVING T. BENNETT, OF BROOKLYN, NEW YORK, ASSIGNOR, BY MESNE ASSIGNMENTS, TO METROPOLITAN ENGINEERING COMPANY, A CORPORATION OF NEW YORK

RADIATOR

Application filed January 30, 1928. Serial No. 250,350.

This invention aims to provide a radiator adapted particularly for heating by electricity, but capable of use also in connection with other heating mediums.

The accompanying drawings illustrate embodiments of the invention.

Fig. 1 is a side elevation of a complete radiator;

Figs. 2 and 3 are opposite end elevations and Fig. 4 is a plan of the same;

Fig. 5 is an enlarged vertical section on the line 5—5 of Fig. 1;

Fig. 6 is a section similar to Fig. 5 but showing certain parts separately as they appear before assembly;

Fig. 7 is a sectional view approximately on the line 7—7 of Fig. 5;

Fig. 8 is a separate view in perspective of one of the insulating blocks;

Figs. 9 and 10 are respectively sections on the lines 9—9 and 10—10 of Fig. 5;

Figs. 11, 12 and 13 are respectively sections on the correspondingly numbered lines of Fig. 10;

Fig. 14 is a separate view of an electric resistance coil.

Referring to the embodiment of the invention illustrated, the heating element comprises two coils of resistance wire 1 extending lengthwise from end to end and passing out through an insulator 2 (Fig. 1) to the circuit wires. The resistance coils are enclosed directly between certain insulating blocks 3 carried in a tubular casing 4 of oblong cross section. A radiating structure is applied to the outside of the casing 4. This consists of two corrugated plates at opposite sides forming transverse fins 5 extending to considerable lateral distance from the casing and also considerably above and to a somewhat less extent below the same; their inner edges being connected by longitudinal webs 6 and their outer edges by similar webs 7. The webs 6 and the inner portions of the fins are bent out at intervals to form recesses 8 shown in Fig. 5 which closely embrace the casing 4. The parts are assembled and fastened by means of straps 9 recessed to embrace the webs 8 and having their end portions 10 welded through the webs 6. The casing and the radiating structure are preferably of copper because of its heat conductivity. The straps 9 are preferably of steel for strength and ease of welding.

Various other methods of uniting the radiating structure to the casing, as well as various other shapes and styles of radiating structure and casing may be used.

Fig. 6 shows the end portions of one of the straps formed with projections 11 to facilitate the welding operation shown in finished condition in Fig. 5.

In the course of time such heaters are liable to burn out. According to the present invention it is made removable and replaceable. The insulation immediately surrounding the wire is made in sections, Fig. 8, of comparatively short length. This contributes to ease of manufacture and to strength of the pieces, and ease of introduction into the casing.

The radiators may be manufactured in standard lengths, each a multiple of the length of the blocks, so that one size of blocks may be used for all sizes of radiator. The porcelain and wire which constitute the heater cost very much less than complete strip heaters of known type, and the cost of the casing 4 may be added and still be well under that of standard strip heaters.

Each block 3 has a rib 12 extending over about half its length and fitting in a groove 13 constituting the remaining half of the length of the opposite block. Longitudinal grooves 14 accommodate the coil 1. Near the ends of each block there are transverse grooves 15 and 16 so that near the inner closed end of the casing 4 the coil can pass continuously from one to the other of the grooves 14 as illustrated for example at the left of Fig. 10.

The wire coil 1, as shown in Fig. 14, may be a close spiral or may be stretched more or less to separate the convolutions and thus to provide a greater or less volume of heat.

The ends of the wire run through an insulating block 2 which is grooved as in Fig. 7 and thus fixed to a plate 17 which is screwed or otherwise detachably fastened on to the end of the radiator in line with the casing 4. The right end plate 18 of the structure has an opening corresponding with that through the casing 4. The left end 19 is preferably closed.

When a heating element is to be introduced the far end of the coil is looped through the transverse opening 15 of one block and laid in the grooves thereof between said block and a half length piece such as 3a, Fig. 10. The two blocks are held together and inserted into the open end of the casing 4. Additional blocks are then added at alternate sides, pushing each in turn into the casing until the casing is full or the desired length is reached, the last block being a half section like 3a. The length of wire for a desired heat value having been fixed, it may be stretched to the full lengths of different standard casings. Or coils of different lengths may be used for different casings.

The radiator, with a casing 4 or an equivalent chamber surrounded by the radiating structure, may be manufactured and sold as a complete commercial unit without the heating element, saving the cost of carrying such heating elements in stock one in each radiator, and leaving the purchaser free to introduce any desired design of heating element. Also the radiators minus the heating element may be installed in a building, leaving the addition of the heating elements until the rooms are occupied.

The convection type of radiator shown may carry in addition pipes or similar provisions for heating by steam or other medium. In fact other heating elements, such, for example, as a loop of steam pipe, may be introduced instead of the electric heating element described. And the radiator may carry two or more casings or chambers for whatever type or types of heating element are to be used. The heat is very rapidly conducted through the transverse fins presenting an extended area for heating the air in contact with it. And the spaces within the outer webs 7 form vertical flues which accelerate the circulation of air and carry off the heat conveyed by the fins at a rapid rate.

An improved appearance for the radiator may be secured by applying a cover or panel over the front and top, as is often done in the case of radiators of other types.

The electric heating element is adapted to other uses than in radiators. Electric furnaces and ovens are sometimes heated by what are called "strip" or "space" heaters. If one of these of the usual type burns out, the entire heater must be scrapped including casing, insulations and wire or resistance element.

With the present style of heater, the casing would be permanent and the porcelains would generally be in good shape so that only the wire would need replacement, which costs only about one-quarter as much as the standard heaters. In fact, the present heater could be substituted for any heating device or equipment using an enclosed resistance element; such, for example, as soldering, curling or other irons, immersion heaters, space heaters and strip heaters.

No claim is made herein to the heater alone or in connection with any other apparatus than radiators, such other use of the heater being claimed in a separate application.

Various other modifications may be made by those skilled in the art without departing from the invention as defined in the following claims.

What I claim is:

1. An air heater of the convection type which comprises an elongated chamber having extended outer heating surfaces, an electric resistance heating element in said chamber having coils expansible lengthwise of said chamber to vary the number of coils and the resistance relative to the length of the element, and insulator sections in said chamber to support said resistance element, said insulator sections being separable one from the other and from said resistance element so that the insulators may be re-inserted with a new resistance element.

2. The air heater of claim 1, the insulators comprising a succession of blocks arranged along the length of the chamber and forming a continuous longitudinal groove for reception of the resistant element.

3. The air heater of claim 1, the insulators comprising a series of blocks at opposite sides of the casing, interlocked with each other and forming a pair of parallel longitudinal grooves communicating at their inner ends to receive a loop of the resistant element.

4. The air heater of claim 1, the insulators comprising a series of blocks at opposite sides of the casing, interlocked with each other and forming a pair of parallel longitudinal grooves communicating at their inner ends to receive a loop of the resistant element, the resistant element being an extensible coil so that a given length of it can be extended or contracted to fill chambers of different lengths.

In witness whereof, I have hereunto signed my name.

IRVING T. BENNETT.